United States Patent [19]

Steer

[11] Patent Number: 4,790,138

[45] Date of Patent: Dec. 13, 1988

[54] MASTER CYLINDER FAST FILL VALVING MECHANISM WITH RAMP

[75] Inventor: John E. Steer, South Bend, Ind.

[73] Assignee: Allied-Signal Inc., Morristown, N.J.

[21] Appl. No.: 10,359

[22] Filed: Feb. 3, 1987

[51] Int. Cl.[4] .......................... B60T 11/08; B60T 11/16
[52] U.S. Cl. .......................................... 60/578; 60/589
[58] Field of Search .................. 60/589, 574, 575, 578; 277/73, 77, 173, 177, DIG. 10

[56] References Cited

U.S. PATENT DOCUMENTS

| | | | |
|---|---|---|---|
| 4,099,380 | 7/1978 | Cadeddu | 60/589 |
| 4,111,441 | 9/1978 | Sick | 277/DIG. 10 |
| 4,249,381 | 2/1981 | Gaiser | 60/562 |
| 4,414,811 | 11/1983 | Gaiser | 60/589 |
| 4,474,005 | 10/1984 | Steer | 60/589 |
| 4,559,781 | 12/1985 | Steer et al. | 60/589 |
| 4,718,234 | 1/1988 | Steer | 60/578 X |
| 4,745,751 | 5/1988 | Gaiser | 60/578 |

Primary Examiner—Robert E. Garrett
Assistant Examiner—George Kapsalas
Attorney, Agent, or Firm—Larry J. Palguta; Ken C. Decker

[57] ABSTRACT

A master cylinder (10, 210, 310, 410) includes a housing bore (14) having at one end (16) a bearing member (18) attached thereto and retaining a sleeve member (20) within the bore (14). One piston (30, 230, 530) has at one end (32, 232) thereof a fast fill mechanism (150, 350, 450). The fast fill mechanism (150, 350, 450) includes a seal support (130, 330, 430), fast fill seal (160, 360, 460), a ramp (132, 332, 432) on the fast fill seal support (130, 330, 430), and a ramp (125, 325, 425, 525) at the one end (32, 232) of the piston. The ramp (125, 325, 425, 525) at the one end (32, 232) of the one piston (30, 230, 530) may be disposed within the piston (230, 530, 441) or on a flange support (120) mounted on the one piston (30). Displacement of the one piston (30) causes an increase in fluid pressure in an associated pressure chamber (88), the pressure causing the ramps (132, 332, 432; 125, 325, 425, 525) to resiliently engage one another until one ramp (125, 332, 432) is displaced radially and permits the fast fill mechanism (150, 350, 450) to be displaced axially along the piston (30, 230, 530, 441). The fast fill seal (160, 360, 460) disengages sealingly from the one end (32, 232) of the piston (30, 230, 530, 441) when displacement aligns the seal (160, 360, 460) with a longitudinal groove (31, 231, 331, 431) in the one end (32, 232) of the piston (30, 230, 530, 441).

27 Claims, 3 Drawing Sheets

MASTER CYLINDER FAST FILL VALVING MECHANISM WITH RAMP

BACKGROUND OF THE INVENTION

1. Field of the Invention

The present invention relates to a fast fill valving mechanism for a master cylinder, particularly a master cylinder which has a short length and compact structure.

2. Description of the Prior Art

Master cylinders usually require an initial period of actuation that produces a hydraulic pressure and fluid displacement which places the wheel brakes in position for the initiation of braking. In other words, a certain amount of hydraulic fluid must be displaced by the master cylinder through the system in order to merely place the pistons and associated brake equipment in position for the initiation of braking. It is highly desirable to provide a master cylinder construction which when actuated effects a quick or "fast fill" of the associated brake lines and braking apparatuses so that the brakes are ready immediately for the commencement of braking. The result is a more quickly responsive braking system because the fast fill construction eliminates a longer brake pedal stroke necessary for effecting the displacement of fluid within the brake system. Prior master cylinder constructions providing for a "fast fill" of the braking system typically include a ball valve and other such devices. These structures are speed sensitive because a slow actuation of the brakes permits fluid leakage through the valving and thus fails to effectively accomplish the desired transmittal of brake fluid to the brake system. U.S. Pat. Nos. 4,559,781 and 4,718,234 illustrate types of flexible sealing mechanisms for a master cylinder having a fast fill function. It is desirable to provide a fast fill mechanism for a short master cylinder which will provide solutions to the above problems and which will be easily assembled and cost less than prior fast fill master cylinder constructions.

SUMMARY OF THE INVENTION

The present invention comprises a master cylinder housing with a bore extending axially therein, a reservoir providing fluid for said bore, a pair of pistons associated with said master cylinder housing, one end of one of said pistons having a fast fill mechanism disposed thereat, characterized in that the fast fill mechanism comprises a seal support having a ramp thereon, fast fill sealing means disposed at said one end of the one piston, and a complementary-shaped ramp disposed at the one end of said one piston, movement of said one piston effecting increased pressure within an associated pressure chamber of said master cylinder and causing said seal support and fast fill sealing means to be displaced so that the ramp on the seal support is biased against the ramp at the one end, the ramps disengaging resiliently from one another at a predetermined pressure such that the fast fill sealing means and seal support are displaced away from the end of the one piston and allow pressure within said chamber to be communicated past said fast fill sealing means.

BRIEF DESCRIPTION OF THE DRAWING

The invention is described in detail below with reference to the drawings which illustrate an embodiments in which.

DETAILED DESCRIPTION OF THE PREFERRED EMBODIMENTS

Figure 1:
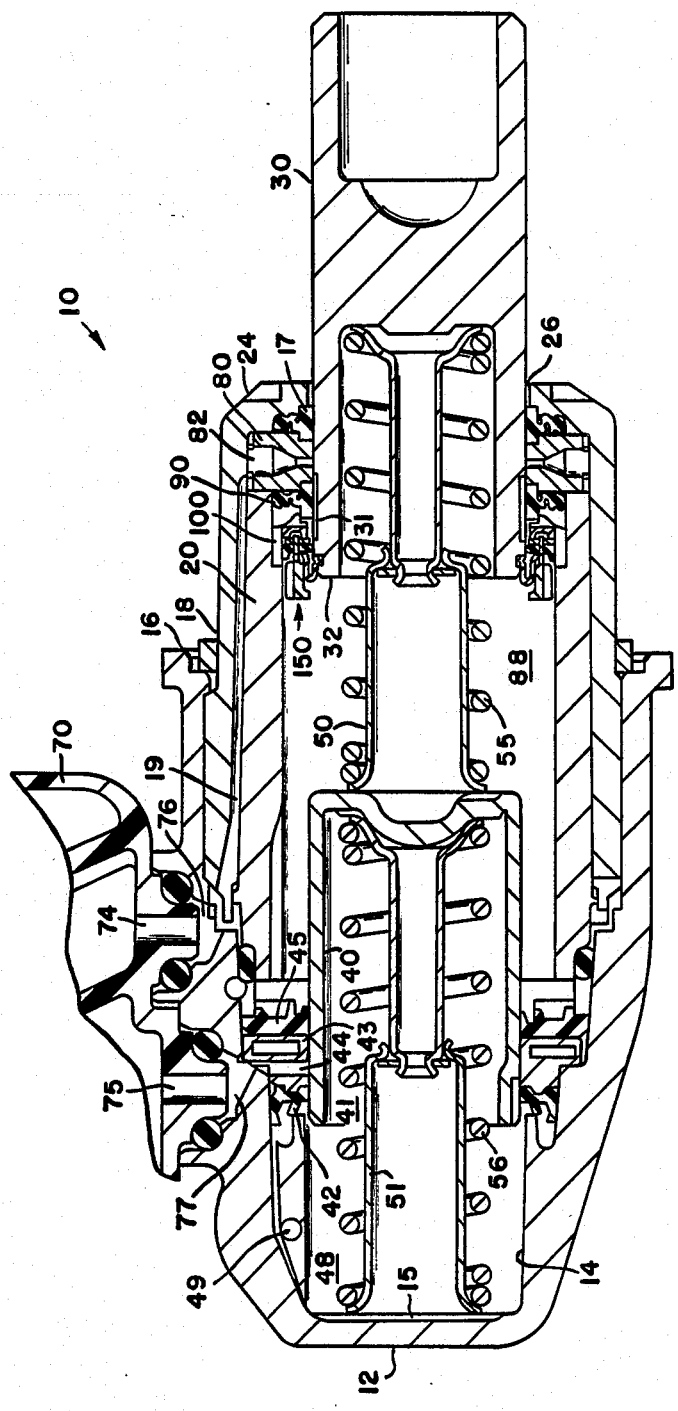
FIG. 1 is a section view of a master cylinder of the present invention.

The master cylinder of the present invention is designated generally by reference numeral 10 in FIG. 1. Master cylinder 10 includes a housing 12 having therein a longitudinal bore 14 with an open end 16. Open end 16 threadably receives a bearing member 18 which positions a sleeve member 20 within bore 14. Bearing member 18 extends radially inwardly at end 24 to provide an opening 26 through which extends a first or primary piston 30. First piston 30 is spaced apart from second piston 40 by a top hat construction 50 which includes spring 55. Second piston 40 is spaced apart from bore end 15 by a top hat construction 51 which includes spring 56. A reservoir 70 is disposed atop and attached to the housing 12. The bearing member 18 includes a longitudinal groove or passageway 19 between the interior surface of the bearing member and sleeve member 20, as described previously in U.S. Pat. No. 4,474,005 incorporated herein by reference. Hydraulic fluid contained within reservoir 70 may communicate through a reservoir opening 74, housing opening 76, and passageway 19 to land opening 82 in land 80. Land 80 abuts pumping seal 90 which is described in co-pending U.S. Pat. No. 4,685,300 incorporated herein by reference. A forward reservoir opening 75 provides for hydraulic fluid communication to bore 14 via a housing opening 77. Second piston 40 includes at an end 41 a flexible seal 42 which engages the interior surface of bore 14, a retainer 43 which includes a radial opening 44 communicating with housing opening 77, and a seal member 45 engaging the interior of bore 14. Bore 14, second piston 40, seal 42, retainer 43, and seal 45 define a second pressure chamber 48 which communicates with an outlet 49.

Bearing member 18 is threadably engaged with housing end 16 and further includes a seal 17. The primary piston 30 includes a longitudinal groove 31 at piston end 32. The land 80 is located between bearing end 24 and piston 30, the land 80 having the radial opening 82 which communicates with passageway 19. Land 80 abuts and positions the flexible seal 90 which is maintained axially in place by land 80 and seal retainer 100. Seal retainer 100 includes lateral openings 111 and radial openings 112. Seal retainer 100 engages the shoulder 22 of sleeve member 20. A fast fill mechanism with ramp or sliding bias mechanism is designated generally by reference numeral 150. The fast fill mechanism 150 comprises a seal support 130, seal backing member 140, flange support 120, and fast fill seal 160. The fast fill seal support 130 is supported between sleeve member 20 and end 32 of piston 30 by means of flange support 120. Flange support 120 is generally U-shaped and includes a plurality of protrusions 122 which engage a circumferential groove 33 in piston end 32. Flange support 120 includes a plurality of radially bent fingers 125 which form ramps that are aligned for engagement with correspondingly shaped ramps 132 of seal support 130. Seal support 130 includes longtiudinal passages 133 and radial openings 134. Positioned on seal support 130 is fast fill seal 160 which includes a flexible arm 162 extending to lateral openings 111 of retainer 100. The seal backing member 140 is mounted on seal support 130 and provides radial support for fast fill seal 160. Seal backing member 140 is positioned for engagement with seal retainer protrusions 115.

The pumping seal 90, piston end 32, fast fill seal 160, and sleeve member 20 define a variable volume chamber 170. When the master cylinder is in the released or unactuated position illustrated in FIGS. 1 and 2, passageway 19 communicates with auxiliary chamber 170 because hydraulic fluid may flow through radial opening 82, longitudinal groove 31, and around the interior diameter of flexible pumping seal 90, and also flow through the leak path 21 or interface of land 80/sleeve member 20, past arm 93 of seal 90, to chamber 170. Likewise, auxiliary variable volume chamber 170 communicates with primary pressure chamber 88. Fluid may flow from chamber 170, through lateral openings 111, past flexible arm 162 of seal 160, and to chamber 88.

Master cylinder 10 operates according to the following steps: In the FIG. 3A position, the master cylinder primary piston 30 has been displaced by a push rod (not shown) coupled with primary piston 30 and is actuated in order to commence a braking cycle, piston 30 having moved inwardly of bore 14. Flexible arm 162 of seal 160 has progressed past the longitudinal openings 111 and longitudinal groove 31 has progressed past pumping seal 90 so that the effective piston pressure area is the outside diameter of fast fill seal 160. Additional travel of piston 30 displaces a larger volume of hydraulic fluid than would be displaced normally by the outside diameter of piston 30. During the additional travel, the volume between fast fill seal 160 and flexible pumping seal 90 increases, i.e. the volume of variable volume chamber 170 increases. Replenishment fluid is drawn into this chamber from the reservoir by means of passage 19 and the pumping capability or inward radial movement of flexible arm 93 of seal 90. Fluid cannot return to reservoir 70 because flexible arm 93 comprises a one-way valve which seals against the inside surface 23 of sleeve member 20. Therefore, during the actuation of the master cylinder, and regardless of the stroke rate of the pistons, there is no loss of fluid (in particular fast fill fluid volume) to the reservoir 70 as would occur with conventional master cylinders. Conventional master cylinders tend to be speed- or application-rate sensitive because the fast fill fluid volume may leak back toward the reservoir and thus defeat the purpose of the fast fill mechanism. The present invention is not speed- or application-rate sensitive. The pistons may be applied at a very slow rate and the fast fill valving mechanism will work effectively.

Figure 2:
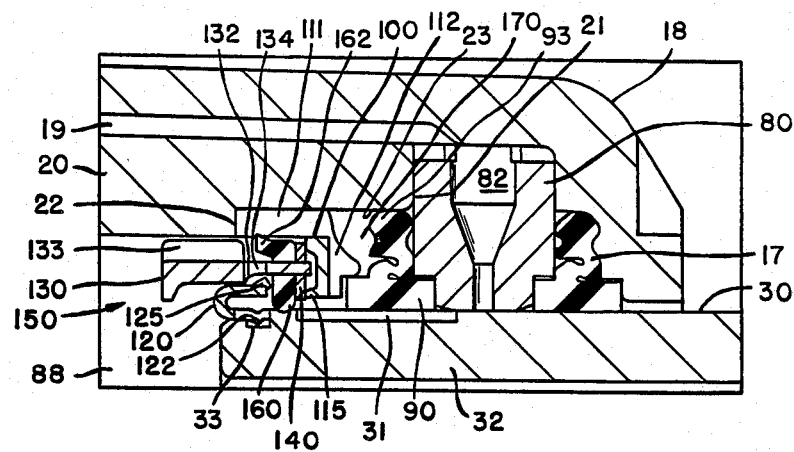
FIG. 2 is an enlarged illustration of the fast fill mechanism.
Figure 3A:
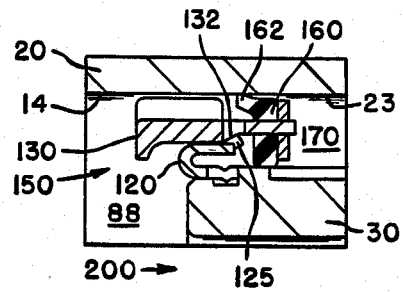
FIGS. 3A-D are section views illustrating progressively the operation of the fast fill mechanism.
Figure 3B:
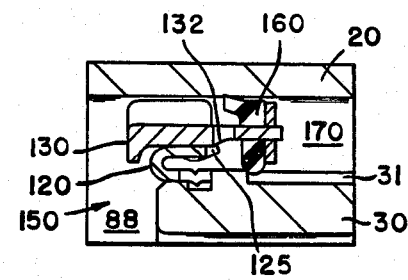
Figure 3C:
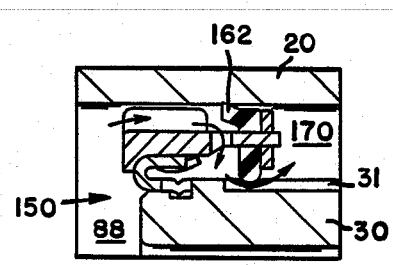
Figure 3D:
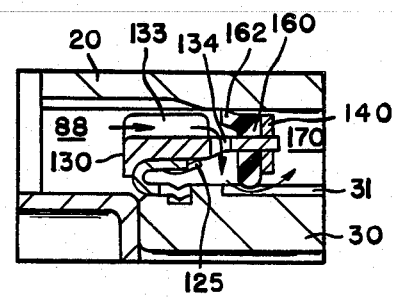

As the pressures increase within chambers 88 and 48 during the actuation of piston 30 and 40, fluid pressure in chamber 88 pushes the fast fill mechanism 150 back toward opening 26 of bearing member 18. As illustrated in FIG. 3A, the seal support 130 has moved to the right in the direction of arrow 200 so that ramps 125 of the flange support 120 engages ramps 132 of the seal support 130. At this position the fast fill seal 160 still effects sealing between end 32 of piston 30 and the interior surface 23 of sleeve member 20. Further progression to the left of piston 30 creates greater pressures within chambers 88 and 48, causing the fast fill seal 160 to be moved, along with seal support 130 further to the right relative to piston 30. At the position in FIG. 3B, the fast fill seal 160 still effects sealing but the inner diameter of seal 160 is beginning to enter the left end of longitudinal groove 31. When pressures in chambers 88 and 48 reach the desired levels, the flange support fingers or ramps 125 deflect inwardly so that ramps 125 ride along ramps 132. This motion provides a cushion for the relief function because the seal support 130 now slows down in its movement relative to piston 30. The movement of seal support 130 is illustrated at an advanced position in FIG. 3C wherein the inner diameter of fast fill seal 160 has aligned with longitudinal groove 31 so that fluid may flow from pressure chamber 88 to variable volume chamber 170. FIG. 3D illustrates the position of the seal support 130, fast fill seal 160, and seal backing member 140 at the end stroke of piston 30. Fluid flows freely from chamber 88 through longitudinal passages 133, radial openings 134, around the inner diameter of seal 160, through longitudinal groove 31 to variable volume chamber 170. During the later portion of the stroking or displacement of piston 30, the flange support fingers 125 provide a minimum restriction to the travel of the seal support 130 relative to piston 30. During the return movement of piston 30, the fluid contained in variable volume chamber 170 may be vented therefrom by means of the flexible arm 162 of seal 160 which moves radially inwardly to allow fluid flow to chamber 88. In addition, at initial movement there will also be venting through longitudinal passage 31, radial openings 134, longitudinal openings 133, to chamber 88. When piston 30 has returned almost to an at-rest or unactuated position, seal backing member 140 engages the protrusions 115 of seal retainer 100 which causes seal support 130, flange support 120, and fast fill seal 160 to return to their initial at-rest position as illustrated in FIGS. 1 and 2.

Figure 4:
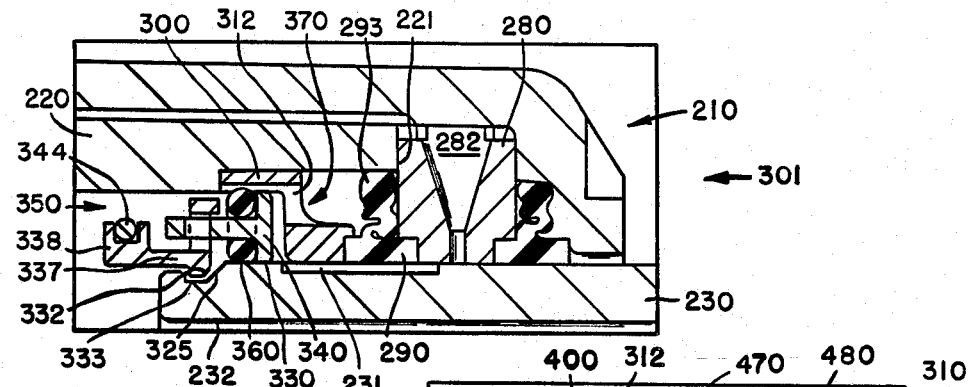
FIG. 4 is an illustration of a second embodiment of the fast fill mechanism.

Referring now to FIG. 4, a second embodiment of the fast fill mechanism with a ramp is illustrated. Similar structure will be indicated by the same reference numeral increased by 200. Sleeve 220 has an end positioned adjacent land 280 which includes a radial opening 282. Land 280 positions pumping seal 290 having flexible end 293 disposed adjacent leak path 221 of sleeve member 220. The piston 230 includes a longtudinal groove 231 aligned radially with pumping seal 290 and seal retainer 300. Seal retainer 300 includes openings 312 to allow fluid flow to and from variable volume chamber 370. A fast fill seal support 330 includes a vertical portion 340 providing radial support for the fast fill seal 360. Seal support 330 includes a flexible portion 337 with receiving portion 338 having a flexible member in the form of a wire clip 344. Seal support 330 includes a ramp 332 aligned with a ramp 325 located within the groove 333 at end 232 of piston 130.

The fast fill mechanism is indicated generally by reference numeral 350 and includes the seal support 330, fast fill seal 360, resilient member 344, and ramps 332 and 325. The fast fill mechanism operates as described above in that as the piston 230 is advanced to the left in the direction of arrow 301, the fast fill pressure area is defined between the outer diameter of fast fill seal 360 and the outer diameter of piston 230, which displaces a greater amount of fluid than would just the outer diameter of piston 230. When the pressure within the chambers of the master cylinder 210 approach a predetermined level, the ramps 332 and 325 engage one another, if not already engaged, and begin to deflect resiliently and radially outwardly the flexible portion 337 of seal support 330. At the predetermined pressure, the ramp 332 deflects resiliently against the biasing force of flexible member 344 and permits the seal support 330 to move further to the right so that fast fill seal 360 aligns with longitudinal groove 231 and permits fluid to flow to chamber 370. The return movement and fluid compensation follows essentially as described above.

Figure 5:
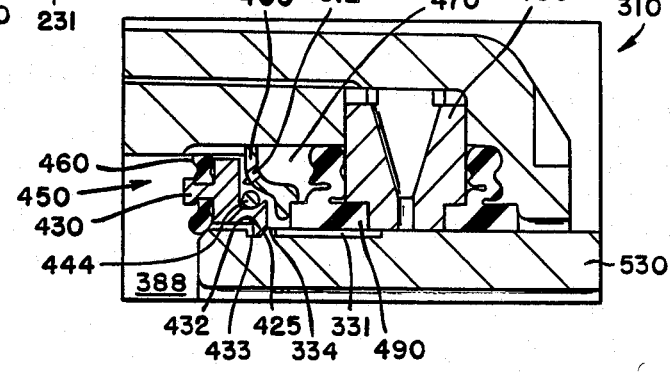
FIG. 5 is an illustration of a third embodiment of the fast fill mechanism.

FIG. 5 illustrates a third embodiment of the present invention wherein the fast fill mechanism 450 includes a seal support 430 having a single fast fill seal 460 disposed axially inwardly of the master cylinder 310. Fast fill seal support 430 includes a ramp 432 aligned with ramp 425 within groove 433 of piston 530. The seal retainer 400 includes longitudinal radial openings 312 communicating with variable volume chamber 470. Retainer 300 retains the pumping seal 490 in axial position against the land 480. The longitudinal groove 331 includes a radially outwardly extending abutment 334 forming a portion of the ramp 425. The operation of the fast fill mechanism 450 is essentially as described above in that as the piston 530 is displaced inwardly of master cylinder 310, the pressure within chamber 388 increases and causes the seal support 430 and ramp 432 to be biased against ramp 425. The ramp 432 is displaced radially outwardly against the biasing force of flexible member 444 so that seal support 430 continues to be displaced axially relative to piston 503 and permits fast fill seal 460 to be aligned with longitudinal groove 331 and fluid to flow there past. The return and compensation flow of fluid is essentially as described above.

Figure 6:
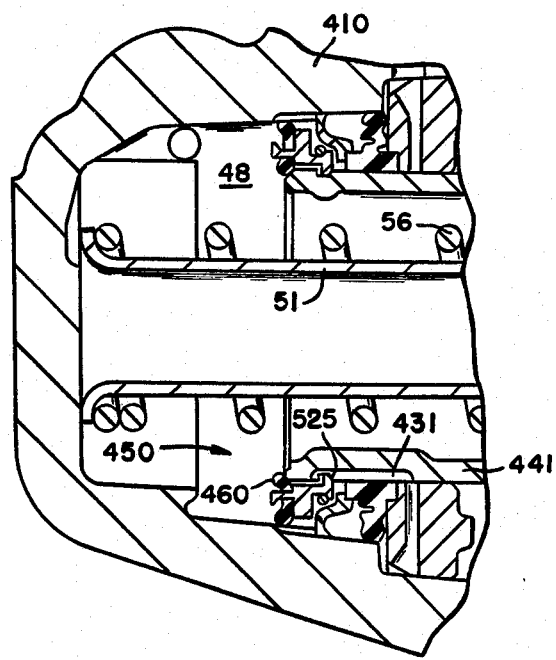
FIG. 6 is a section view of the third embodiment of the fast fill mechanism with an alternative longtiudinal groove disposed in an end of the associated piston.

FIG. 6 illustrates an alternative structure for the above-described piston longitudinal groove when the groove is disposed at the end of the secondary piston 441. The secondary piston 441 has a fast fill mechanism 450 disposed at an end thereof and is essentially identical to the fast fill mechanism 450. The ramp 525 is disposed directly within groove 431 instead of axially adjacent the groove, so that during actuation the fast fill seal 460 is displaced a shorter distance in order to be aligned with groove 431. This is advantageous because the stroke of piston 441 is shorter and has a reduced distance of permitted travel within chamber 48 of the master cylinder 410.

An important feature of the present invention is that each of the embodiments provides a fast fill mechanism for a master cylinder which reduces the required input force once the fast-fill or predetermined pressure is obtained. The initial additional input effort or force required to operate the master cylinder because of the larger diameter fast fill mechanism, is reduced after the mechanism has been actuated and the fast fill pressure vented to the variable volume chamber. Thus, during post fast fill operation of the master cylinder, the input force is reduced to normal piston diameter actuation force. A construction having similar characteristics is disclosed in U.S. Pat. No. 4,745,751 entitled "Master Cylinder with Fast Fill Valving Mechanism" by Robert F. Gaiser.

Although the present invention has been illustrated and described in connection with example embodiments, it will be understood that this is illustrative of the invention, and is by no means restrictive, thereof. It is reasonably to be expected that those skilled in the art can make numerous revisions and additions to the invention and it is intended that such revisions and additions will be included in the scope of the following claims as equivalents of the invention.

I claim:

1. A master cylinder, comprising a master cylinder housing with a bore extending axially therein, a reservoir providing fluid for said bore, an end of said housing having a bearing member attached thereto and retaining a sleeve member within said bore, a pair of pistons associated with said master cylinder housing and one of said pistons extending through an opening in said bearing member, an end of said one piston having a fast fill mechanism disposed thereat, the fast fill mechanism comprising a seal support having a ramp thereon, fast fill sealing means disposed between said end of the piston and interior surface of said sleeve member, and a complementary-shaped ramp disposed at the end of said one piston, movement of said one piston effecting increased pressure within an associated pressure chamber of said master cylinder and causing said seal support and fast fill sealing means to be urged toward said opening so that the ramp on the seal support is biased against the ramp at the piston end, the ramps disengaging resiliently from one another at a predetrmined pressure such that the fast fill sealing means and seal support are displaced away from the end of the one piston and allow pressure within said chamber to be communicated past said fast fill sealing means.

2. The master cylinder in accordance with claim 1, wherein the one end of the one piston includes therein a longitudinal groove, the longitudinal groove permitting, selectively, pressure within the chamber to flow past said fast fill sealing means.

3. The master cylinder in accordance with claim 2, wherein the seal support extends through said fast fill sealing means and is coupled with a seal backing member.

4. The master cylinder in accordance with claim 1, wherein the ramp at the end of the one piston is disposed on a flange support, the flange support attached to the end of the one piston.

5. The master cylinder in accordance with claim 4, further comprising a land disposed between the bearing member and the one end of the one piston, the land having at least one radial opening providing for fluid flow therethrough.

6. The mast cylinder in accordance with claim 5, wherein the one end of the one piston includes a longitudinal opening which permits fluid flow from the radial opening in the land to the fast fill sealing means.

7. The master cylinder in accordance with claim 6, further comprising a pumping seal disposed between said sleeve member and the one end of the one piston, the pumping seal being aligned radially with said longitudinal opening in the one end of the one piston when the piston is at an unactuated position.

8. The master cylinder in accordance with claim 4, wherein the flange support includes at least one finger extending therefrom, the complementary-shaped ramp at the end of said one piston disposed on a surface of the finger.

9. The master cylinder in accordance with claim 8, wherein the flange support includes a plurality of fingers, the complementary-shaped ramp comprising a plurality of ramps on associated surfaces of the fingers.

10. The master cylinder in accordance with claim 8, wherein the one piston includes an annular groove at the one end, the flange support having a plurality of protrusions extending within said groove in order to attach the flange support to the end of the one piston.

11. The master cylinder in accordance with claim 10, wherein the flange support is generally U-shaped.

12. The master cylinder in accordance with claim 1, wherein the seal support includes therein a plurality of longitudinal passageways.

13. The master cylinder in accordance with claim 12, wherein the master cylinder further comprises a seal retainer disposed between said sleeve member and the one end of the one piston, the seal retainer including a plurality of lateral openings.

14. The master cylinder in accordance with claim 13, further comprising a pumping seal disposed between said one end of the one piston and sleeve member, the pumping seal maintained in place by the seal retainer.

15. A master cylinder, comprising a master cylinder housing with a bore extending axially therein, a reservoir providing fluid for said bore, an end of said housing having a bearing member attached thereto and retaining a sleeve member within said bore, a pair of pistons associated with said master cylinder housing, one end of one of said pistons having a fast fill mechanism disposed thereat, the fast fill mechanism comprising a seal support having a ramp thereon, fast fill sealing means disposed at said one end of the piston, and a complementary-shaped ramp disposed at the one end of said one piston, movement of said one piston effecting increased pressure within an associated pressure chamber of said master cylinder and causing said seal support and fast fill sealing means to be urged toward an end of said bearing member so that the ramp on the seal support is biased against the ramp at the one end, the ramps disengaging resiliently from one another at a predetermined pressure such that the fast fill sealing means and seal support are displaced away from the one end of the one piston and allow pressure within said chamber to be communicated past said fast fill sealing means.

16. The master cylinder in accordance with claim 15, wherein the seal support includes a flexible portion having the associated ramp thereon, the flexible portion maintained in contact with the one end of the piston by means of a resilient member diposed thereabout.

17. The master cylinder in accordance with claim 16, wherein the resilient member is disposed at one side of the seal support and the fast sill sealing means comprises a seal member disposed at the other side of the seal support.

18. The master cylinder in accordance with claim 17, further comprising a seal retainer disposed between said sleeve member and the one end of the one piston.

19. The master cylinder in accordance with claim 16, wherein the fast fill sealing means comprises two seal parts disposed in radial alignment with one another and on each radial side of the seal support.

20. The master cylinder in accordance with claim 19, wherein the one end of the one piston includes a longitudinal opening for communicating fluid to said two seals.

21. The master cylinder in accordance with claim 20, wherein the complementary-shaped ramp at the one end of the one piston is disposed within a groove at said one end and is positioned for engagement with the ramp on the seal support.

22. The master cylinder in accordance with claim 15, wherein the one end of the one piston includes therein a longitudinal groove, the longitudinal groove permitting pressure within the chamber to flow past said fast fill sealing means.

23. A master cylinder, comprising a master cylinder housing with a bore extending axially therein, a reservoir providing fluid for said bore, a pair of pistons associated with said master cylinder housing, one end of one of said pistons having a fast fill mechanism disposed thereat, characterized in that the fast fill mechanism comprises a seal support having a ramp thereon, fast fill sealing means disposed at said one end of the one piston, and a complementary-shaped ramp disposed at the one end of said one piston, movement of said one piston effecting increased pressure within an associated pressure chamber of said master cylinder and causing said seal support and fast fill sealing means to be displaced so that the ramp on the seal support is biased against the ramp at the one end, the ramps disengaging resiliently from one another at a predetermined pressure such that the fast fill sealing means and seal support are displaced away from the end of the one piston and allow pressure within said chamber to be communicated past said fast fill sealing means.

24. The master cylinder in accordance with claim 23, wherein the one end of the piston includes therein a longitudinal groove, the longitudinal groove permitting pressure within the chamber to flow past said fast fill sealing means.

25. A master cylinder, comprising a master cylinder housing with a bore extending axially therein, a reservoir providing fluid for said bore, a pair of pistons associated with said master cylinder housing, one of said pistons having a fast fill mechanism disposed thereat, the fast fill mechanism including means for reducing an input master cylinder actuation force after a predetermined fast fill pressure is attained in an associated pressure chamber, the reducing means including a resilient mechanism which permits the fast fill mechanism to be displaceably actuated toward an exterior end of the one piston by the predetermined fast fill pressure so that the fast fill pressure is relieved smoothly and deteriorates substantially, and the fast fill mechanism continuing to be displaceably actuated toward the exterior end of the one piston after the predetermined fast fill pressure has deteriorated and while the one piston is returning towrad an at-rest position.

26. The master cylinder in accordance with claim 25, wherein the resilient mechanism includes a sliding bias mechanism that remains displaceably actuated toward the exterior end of the one piston while the one piston returns toward the at-rest position.

27. The master cylinder in accordance with claim 26, wherein the master cylinder includes a bearing member at one end of the housing and the bearing member retaining a sleeve member, the one piston extending through an opening in the bearing member.

* * * * *